United States Patent [19]
Cox et al.

[11] Patent Number: 6,154,723
[45] Date of Patent: Nov. 28, 2000

[54] VIRTUAL REALITY 3D INTERFACE SYSTEM FOR DATA CREATION, VIEWING AND EDITING

[75] Inventors: Donna J. Cox; Robert M. Patterson, Jr., both of Champaign, Ill.; Marcus L. Thiebaux, Marina Del Rey, Calif.

[73] Assignee: The Board of Trustees of the University of Illinois, Urbana, Ill.

[21] Appl. No.: 08/986,276

[22] Filed: Dec. 5, 1997

Related U.S. Application Data

[60] Provisional application No. 60/032,249, Dec. 6, 1996.

[51] Int. Cl.[7] .................................................. G10L 21/00
[52] U.S. Cl. ........................ 704/270; 704/275; 345/355; 345/978; 345/474
[58] Field of Search .................................. 704/270, 275, 704/276; 345/474, 475, 427, 442, 355, 978

[56] References Cited

U.S. PATENT DOCUMENTS

| | | | |
|---|---|---|---|
| 5,414,801 | 5/1995 | Smith et al. | 345/419 |
| 5,548,694 | 8/1996 | Frisken Gibson | 345/424 |
| 5,680,524 | 10/1997 | Maples et al. | 345/427 |
| 5,696,892 | 12/1997 | Redmann et al. | 395/112 |
| 5,758,122 | 5/1998 | Corda et al. | 395/705 |
| 5,793,382 | 8/1998 | Yerazunis et al. | 345/474 |
| 5,835,684 | 11/1998 | Bourne et al. | 395/90 |
| 5,890,122 | 3/1999 | Van Kleeck | 704/275 |
| 6,009,394 | 12/1999 | Bargar et al. | 704/258 |

OTHER PUBLICATIONS

Jonathan Luskin, "The Universe in a Cave", *IRIS Universe*, No. 35, pp. 28–32, Spring 1996.

Sara Latta, "Astrophysical Simulations Come Alive in a Cosmic Voyage", *NCSA Access*, vol. 10, No. 2, pp. 2–5, Summer 1996.

*Primary Examiner*—Richemond Dorvil
*Assistant Examiner*—Abul K. Azad
*Attorney, Agent, or Firm*—Greer, Burns & Crain, Ltd.

[57] ABSTRACT

A three dimensional virtual reality creation, manipulation and editing system including a voice and three dimensional gesture input interface. An operator immersed in a data structure preferably presented in a three dimensional immersion environment interacts with the data structure and performs operations on the data structure in the environment through the voice and gesture input interface. A virtual director receives input from the voice and gesture interface. The director records the input as keyframe values that are necessary time-based spline data points for commanding the display environment to redisplay a recorded spline path for viewing or operational purposes. The voice recognition system accepts commands according to a menu displayed in the three dimensional environment to enable various operational and display functions through the gesture input portion of the interface.

23 Claims, 5 Drawing Sheets

HOME

```
CREATE      READ/WRITE    PERFORMANCE     EDIT    DISPLAY/HIDE    PLAYBACK         RENDER
CAMERA      CAMERA        RECORD                  RENDER          PLAY             CURRENT
DATA        DATA          ZOOM                    CAMERA #        PAUSE            FRAME #
LIGHT       LIGHT           in/out                DATA #          STOP             FRAME RANGE ##
PIVOT       MIX             stop                  LIGHT #         FRAME            SEQUENCE
MIX         SESSION       STOP                    FIELDCHART      FRAME RANGE      INCREMENT
                            OPTIONS               PIVOT           SPEED%           OPTIONS
                              zoom speed #        ICON            OPTIONS            to disk
                              ease in/out           sphere          loop on/off      to tv
                              ease in               arrow           mix on/off       to cave
                              ease out              camera                           stereo
                                                  MENU                               mono
```

```
CAMERA              DATA                LIGHT               MIX                   PIVOT
*KEYFRAME           *KEYFRAME           *KEYFRAME           *DISPLAY/HIDE         *KEYFRAME
*GLOBAL             *GLOBAL             *GLOBAL             *PLAYBACK             PARENT
*DISPLAY/HIDE       *DISPLAY/HIDE       *DISPLAY/HIDE       *RENDER
*PLAYBACK           *PLAYBACK           *PLAYBACK           FRAME #
*RENDER             *RENDER             *RENDER             FRAME RANGE ##
OPTIONS             OPTIONS             OPTIONS             CUT TO #
  zoom speed #        scale speeed #      spot              DISOLVE TO #
  focus frame #       opacity %           point
  approx. res                             ambient
                                          directional
```

| Fig. 2A |
|---------|
| Fig. 2B |

Fig. 2

KEYFRAME
FRAME #
EDIT
KEY
NEXT
LAST
COPY
DELETE
SELECT #

GLOBAL
EDIT
KEY
SCALE
ROTATION
POSITION
DELETE
OPTIONS
  pivot on/off

Fig. 2B

* THE ASTERISK SIGNIFIES ACCESS TO ANOTHER MODULE'S COMMANDS FROM WITHIN A MODULE

Fig. 3

```
IN THE PARENT PROCESS:
     while(1)    {
          input();
          application_PPR();
          synch();

IN A DISPLAY PROCESS:
     while(1    {
          synch();
          application_FFN();
          application_DSP();/*left eye*/
          application_DSP();/*right eye*/
          graphics_swap();
```

VIRTUAL REALITY 3D INTERFACE SYSTEM FOR DATA CREATION, VIEWING AND EDITING

PRIOR APPLICATIONS

This application claims priority under 35 U.S.C. §119(e) based upon co-pending provisional application 60/032,249, filed on Dec. 6, 1996.

FIELD OF THE INVENTION

The present invention generally relates to virtual reality systems in which an operator virtually interacts with a three dimensional data structure. More specifically, the present invention concerns a three dimensional virtual reality system including a three dimensional gesture and voice command input interface to permit intuitive user operations within the three dimensional data structure, including creating, editing, viewing, and playback of motion in three dimensional space.

BACKGROUND OF THE INVENTION

Many special effects in modern cinematography and animation are the result of nonintuitive and labor intensive electronically assisted manipulations of image data. The same may be said of scientific applications, such as event simulations based upon a limited set of discrete data. Much of the work necessary to view, edit, and create images is rendered cumbersome by the interfaces typically utilized for such operations.

Traditional two dimensional input devices, such as the mouse, have been used with relative success by human operators, but with serious drawbacks including repetitive stress injuries. For an operator performing data manipulation on a mouse and keyboard, specification of a single image or other data object typically would require six separate mouse and/or keyboard operations, three for position (x, y, z) and three for rotation (x, y, z). Typically, the six components would be managed by an operator through separate setting of each component via the mouse, or by typing separate numerical values for the components. The same process must be undertaken to alter a perspective view of an object, frequently referred to as camera placement. The data intensive nature of image manipulations and data simulations quickly renders relatively simple operations extremely cumbersome, and potentially uncomfortable or harmful to an operator performing a large number of the input operations in repetitive fashion.

The two dimension input scheme for three dimensional environments is also counterintuitive. This initially presents a hurdle to new users, who may take a large amount of time to learn and understand the commands and specifications necessary for the entry of three dimensional data or commands via the two dimensional interface or a text interface. For experienced users, the need to interact with the two dimensional input and text interfaces is distracting, preventing absolute focus on the work being conducted.

In some respects, these problems are similar in nature to the difficulties encountered by early computer users who were required to rely on mere textual input for two dimensional display manipulation. The more intuitive window based menu systems lower the amount of knowledge necessary to perform operations in the environment. Similarly, the window based environments allowed easier transition to unfamiliar applications. With two dimensional input interfaces for three dimensional data object spaces, the same difficulties are revisited, as different applications might have different input formats.

Much trial and error is also involved in the two dimensional manipulation of three dimension data as an operator first enters a believed desired set of location and rotation coordinates only to find that the end result is not what was intended. Just as persons who have lived with the U.S. set of standard measures such as feet and inches have difficulty appreciating the distance of a meter without conducting a mental calculation, users of the two dimensional interface have difficulty appreciating the effect of a coordinate set in a three dimensional data space.

Another difficulty in conventional systems for operations on three dimensional data structures concerns the acquisition of an initial set of data on which operations are to be performed. Many conventional techniques use motion capture. For example, motion capture may be used to define a set of data for human motion and facial expression on which subsequent operations are to be performed. The motion capture input tends to be noisy, though, and accordingly needs extensive post-processing to be useful.

Accordingly, there is a need for a new system for performing operations on three dimensional data structures which addresses the aforementioned difficulties and disadvantages. It is an object of the present invention to provide such an improved system.

It is a further object of the present invention to provide an improved system for performing operations on a three dimensional data structure, the system including a three dimensional and voice controlled interface and a data immersion environment permitting an operator to interact with three dimensional data structures in the immersion environment through intuitive use of the interface.

Another object of the present invention is to provide an improved system for performing operations on a three dimensional data structure which permits choreographed visualizations of time variant data and analysis of the data from multiple perspective angles.

An additional object of the present invention is to provide an improved system for performing operations on a three dimensional data structure which permits an operator to perform data structure operations through voice commands and spatial gestures.

A still further object of the present invention is to provide an improved system for performing operations on a three dimensional data structure which is less cumbersome and more intuitive to users.

SUMMARY OF THE INVENTION

The present invention concerns a voice and spatially actuated virtual director system, including an immersive virtual environment. The virtual director permits an operator to utilize voice commands and three dimensional spatially tracked gesture inputs while immersed in a three dimensional data structure to perform data structure operations, for example creating, performing, editing, outputting and/or playing back of motion path. These operations might be used to control virtual cameras governing data perspectives, for animation recording, for interactive display, for simulations and things of a similar nature. The voice and gesture based interaction in the three dimensional environment is a highly efficient virtual direction method permitting intuitive operations by an operator immersed in the data structure.

A preferred embodiment of the invention utilizes a CAVE™ (Cave Automated Virtual Environment) three dimensional immersion environment. This automated environment is a multiperson, room-size, high resolution three dimensional video and audio environment including real time computer graphics projections and operator stereo glasses. A virtual director accepts voice and spatial movement input to allow an operator immersed in a data structure graphically presented in the immersion environment to control a virtual camera that will alter the perspective from which objects in the environment are viewed. Menus may be activated through the voice commands to enable additional functions of the spatial gesture input device, which may be, for instance, a magnetically tracked glove worn by an operator. The system also includes features such as performance recording of operations, editing of recorded paths, control of playback parameters, and control of display elements. The preferred embodiment is a robust system, preferably using time-based splines for operations.

BRIEF DESCRIPTION OF THE DRAWINGS

Other features, objects and advantages of the invention will be apparent to artisans by reference to the detailed description and the drawings, of which.

DETAILED DESCRIPTION OF THE PREFERRED EMBODIMENT

Broadly, the present invention is a three dimensional data structure system including a highly intuitive and efficient virtual director input interface. Through the interface, an operator may fully interact with and perform operations on a data structure presented in three dimensions in the virtual environment. Voice commands and three dimensional spatial inputs are recognized by the director to facilitate the operator interaction.

Figure 1:
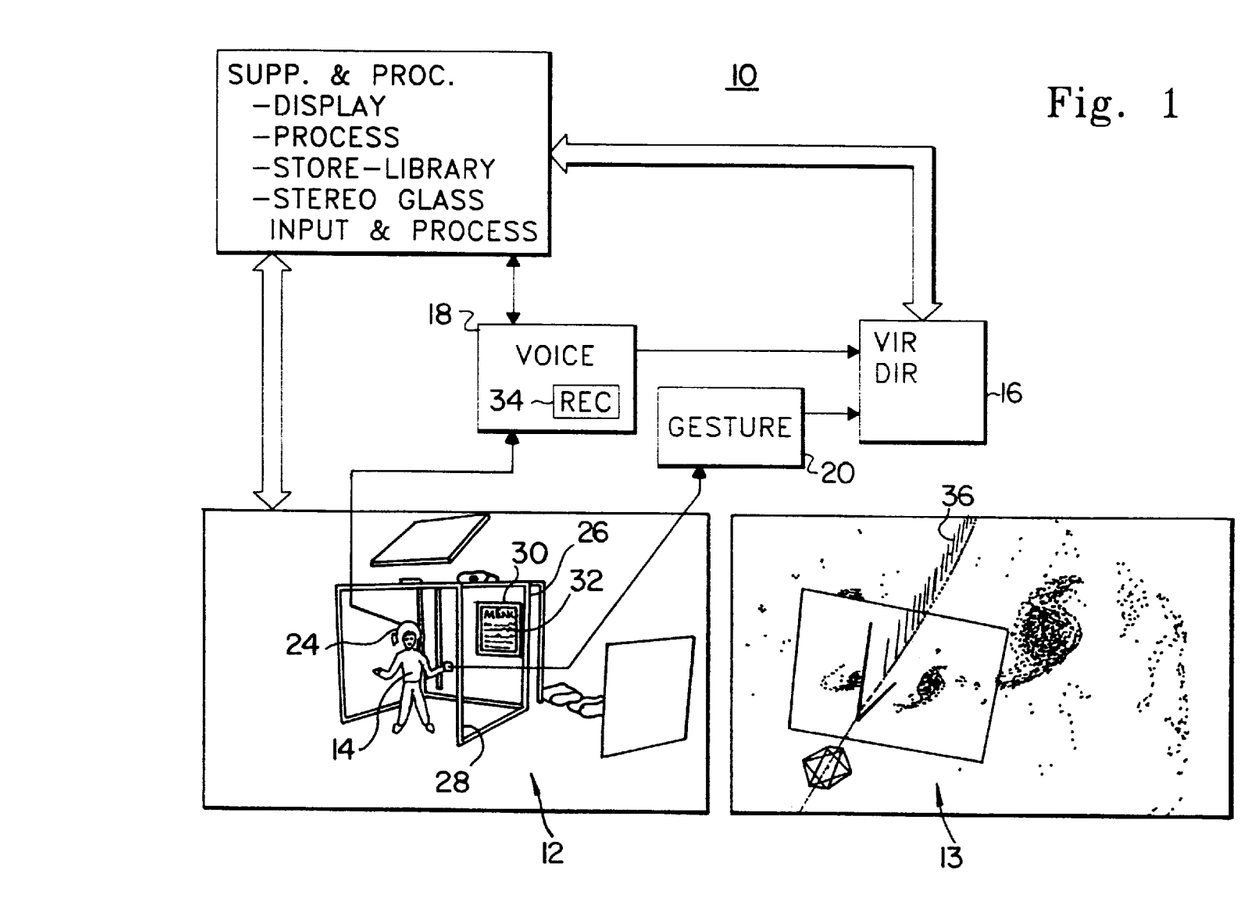
FIG. 1 is a block diagram of a system according to the present invention.

Referring now to FIG. 1, the present system 10 includes an environment 12 which preferably immerses an operator in a three dimensional data structure 13. Data presented to an operator 14 in the environment 12 may be created or operated upon through a virtual director 16. Input to the virtual director 16 is through voice, by voice recognition subsystem 18, and through manipulation of a spatial tracker 20, which allows six degree of freedom manipulation. Support processing and equipment 22 will include libraries, computations, stereo user glasses and display subsystems. The nature of the support processing and equipment will depend upon the environment 12, and different environments may be used in the present system 10. The basic requirement of a suitable environment is acceptance of textual inputs to enable its performance functions and its display manipulation functions.

A particular preferred embodiment of the invention uses a CAVE™ immersion environment 12. The University of Illinois at Chicago (UIC) originally developed the CAVE™. The CAVE™ is a multiperson, room-sized, high-resolution three dimensional video and audio environment. Real-time computer graphics are rear-screen projected in stereo onto three walls, and front projected onto the floor. The graphics are computed by a Silicon Graphics Onyx system with Reality Engines™ for each wall and floor. Operators and users wear stereo glasses to view images in three dimensions. A head tracking device is affixed to stereo glasses that are worn by the operator. As the head tracker moves, stereo projection and convergence is constantly updated for the operator's perspective. Other users with stereo glasses in the CAVE™ see the operator's stereo three dimensional projection. A hand-held tracking device, called the wand, is held by the operator; it has three buttons and a pressure-sensitive joystick. Operators can use the wand to operate functionality of CAVE™ applications. A Flock of Birds System, made by Ascension of Burlington, Vt., magnetically tracks position and orientation of head and wand sensors in the three dimensional space.

A CAVE™ software library handles the perspective display transformation and provides utilities for applications to be written in the immersion environment. Each application has a three dimensional computer graphics representation in memory which is displayed in the CAVE™. Many applications have been developed using the CAVE™ and the three dimensional stereo display. Most of these use only hand-held wand button and joystick input for selecting functions and viewing options. The three wand buttons provide highly limited control of application functionality. In addition, navigation in such conventional CAVE™ applications is limited and actuated through forward, reverse, and sideways manipulation of the joystick.

Unlike the conventional CAVE™ applications, the present system 10 including the virtual director 16 allows an operator to freely navigate easily and accurately through the three dimensional data structure 13, and control and edit positions and orientations of spline keyframes in time. The system 10 of the invention employs voice activated free form navigation in all directions through the relative six degree of freedom motion of the wand. A detailed menu system with a command line input structure accepts voice commands. The interaction of triggering commands with voice and entering three dimensional information via a spatially tracked wand, including six degree of freedom motion tracking enables the accurate control of many different types of parameters. The system of the invention has been used to navigate and choreograph scientific data to create animations for the "Cosmic Voyage" IMAX film.

Operation of the Virtual Director

The virtual director 16 enables the creation of three dimensional time based splines that represent both position and orientation with the use of voice command and a spatially tracked input device. Principally, the virtual director 16 creates a virtual computer graphics camera to permit perspective adjustments in the immersed data structure 13. This is useful for visualizations of scientific simulation, animations, and other similar applications. Wearing stereo liquid crystal glasses and viewing stereo rear projected three dimensional scientific data in the immersion environment 12 immerses the operator 14 in the data. A wireless microphone headset 24 is also worn and can be toggled on and off when inputting voice commands to the system 10. A menuing system 26 is displayed along the front wall 28. A voice command of a menu results in a display of functions available in that menu, which may then be activated by any of the visible commands via voice. Above the menu is a history of previous commands and responses from the system. A small X window appears on the upper right section of the screen as command line input from the voice recognition system. Under this window is a virtual television monitor. These display components have characteristics and positions which are user configurable.

A command line menu 30 appears in a small window 32 of the immersion environment 12 to verify and provide feedback as to the content and accuracy of the voice recognition. A commercial voice recognition system 34 may run on a PC. Preferably, the voice recognition system 34 permits the use of voice "aliases" to customize user commands. This allows the operator to say a word or phrase not specifically provided for in the menu 30 and have the system output a different word or series of commands that the virtual director 16 understands. This also allows for more than one voice command to trigger a single command.

The voice recognition system 34 sends keystrokes and control characters to the Silicon Graphics system running the CAVE™ graphics through a telnet window. The voice commands are entered into the command line interface to the virtual director. These commands are used to access different menus and to activate functions. Some commands trigger input from the spatially tracked wand 28 and alter parameter input based on specific wand gestures. A few example voice commands and their corresponding wand movements are specified in Table 1.

TABLE 1

| COMMAND | FUNCTION |
| --- | --- |
| "navigate" | Selects the navigate menu. |
| "fly" | Activates freeform flying with wand input. The motion of the wand relative to its position when the command was activated directs flight through the data or environment. Moving the wand slowly forward accelerates the viewer forward. Moving the wand back to its original position will slow flight to a stop. Rotating the wand rotates the viewer around the wand. Flying allows a full range of translation and rotation. |
| "release" | Stops navigation flight. |
| "edit" | Selects the edit menu. |
| "camera" | Attaches a virtual camera to the wand for absolute positioning in virtual space. |
| "take it" | Saves the last wand position for the current camera keyframe. |
| "play" | Plays the current camera path. |
| "stop" | Stops play mode. |
| "shuttle" | Enables shuffling of the camera along the camera spline. Twisting of the wand, like a shuttle wheel on a video deck, moves the camera forward and backward along the spline. |

Table 1 presents just a few examples of the different types of voice command, gesture input methods that can be entered quickly and easily. The wand gesture input is tuned for each type of function to be as intuitive and controllable as possible. Wand gestures include absolute positioning and rotation, relative and scaled input from positioning and rotating the wand, and also techniques like twisting, similar to a knob controller.

Functions like scale and shuttle use the twisting wand movement. Camera placement uses an absolute wand positioning method. Keyframe adjusting uses a fraction, such as one-tenth, of the wand's relative movements for detailed adjustments. When adjust is invoked, the system 10 takes the initial wand position as an origin and relative movements and rotations from that position are then scaled and applied to the current keyframe. This relative wand input, invoked and saved by voice, allows the adjustment of keyframes from a distance. This is best accomplished by aligning the wand 28 in the direction the virtual camera is pointing and inputting incremental spatial adjustments while looking at the virtual monitor.

With voice control, the potential variety of commands is unlimited. With the combination of voice commands and spatially controlled gesture input, a wide variety of functionality can be operated with speed and precision. The major areas of functionality in the preferred embodiment include navigation and scale, path performance recording, path editing, playback controls, display controls, file management and session configuration. These major areas are outlined below.

Navigation

In order to choreograph visualizations of time variant scientific data, and analysis from all angles, searching for the most scientific and revealing aspects is necessary. Similarly, such changes of perspective are useful to analyze a movie scene for a motion picture. Numerous methods for navigating through the environment 12 are provided by the system 10. Flight is an exemplary navigation mode. Others include zoom and pivot.

Performance Recording

Figure 1A:
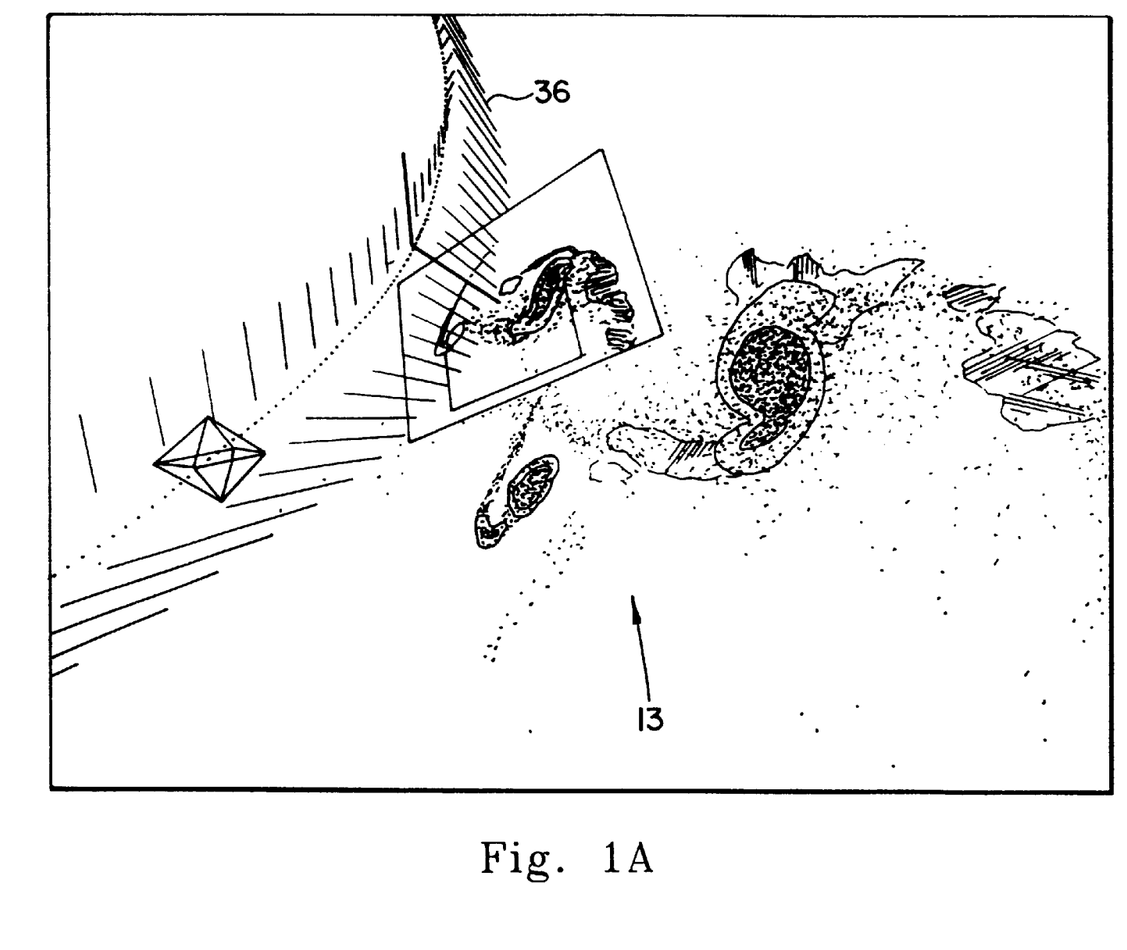
FIG. 1(a) shows a virtual camera path vector display.

The operator 14 can performance record a spline path in two distinctly different methods. The first is to record a path directly from the wand position and orientation in space. The second is to scale the environment up and record a navigation flight through the environment. Performance recording saves camera keyframes at specified frame intervals. The keyframes specify field of view, keyframe recording time, three dimensional position and three dimensional orientation. Since most animations are constructed at either 30 frames per second for video or 24 frames per second for film, it can be beneficial to drop keys every 30 or 60 frames. This gives a sense of time and velocity when viewing the spline with camera vectors displayed at each key or periodically along the spline, and may be useful to reduce noise. The vectors may be, for instance, camera normal and up vector. These vectors 36 may be displayed as shown in FIG. 1 and in FIG. 1(*a*), which shows a series of the vectors 36 indicating a virtual camera path including its orientation along the path in the three dimensional data structure 13.

Path Editing

After recording a path, keyframes can be adjusted, deleted, inserted, and moved to different times. Spline paths can also be built up from scratch, one key at a time. The operator 14 can shuttle through time and place camera/object keyframes at desired locations, interactively building and viewing the spline. The interaction between voice and gesture for editing keyframes is crucial to the efficiency of these operations.

Playbacks Controls

After creating a path, the camera/object motion can be played back with the result showing on the virtual monitor. Shuttling is also available by saying "shuttle" and twisting the wand 28 like a shuttle knob on a video deck.

Display Controls

The operator 14 can toggle on and off the display of every component with voice commands. Informative graphs and data displays can be made visible for detailed information about many aspects of the system 10. Major elements like the virtual television monitor and the menu text are often toggled on and off.

File Management

A critical component is the ability to read in previous work and save out new work. This is accomplished by a work space where choreography of the virtual director 16 entered. From the work space, splines are saved to permit recreation and alteration. The splines may be used, for example, to render animations using other rendering packages.

The virtual director 16 accepts control for spatial wand movements in six parameters simultaneously, and manipulates the parameters using advanced splines for calculating the transformation matrices in real time. The six parameters are x, y, z position and x, y, z rotation. This three dimensional input method is superior to a mouse or space balls because intuitive user gestures with a wand in three dimensional space are used to control virtual paths in the artificial space of three dimensional computer graphics. For the operator, this type of control in the three dimensional synthetic computer graphics space is much like holding a real physical camera in real physical space without the physical limitations (like gravity). In addition, the path is immediately traced out in real-time, shown in stereo, suspended in the view of the operator through the environment 12 and becomes easy to edit with spatially entered adjustment controls activated through voice commands.

Some conventional methods use motion capture in defining the animation of human motion and facial expression. This type of input tends to be noisy, and needs extensive data post-processing to be useful. In contrast, the virtual director 16 creates splines during the voice and six degree of freedom spatial recording process which accordingly smooths the noisy data immediately. This involves motion capture to save the input at intervals and immediately creates the three dimensional spline. This spline can then be interactively edited such that nonuniform keyframing is possible.

Figures 2, 2A:
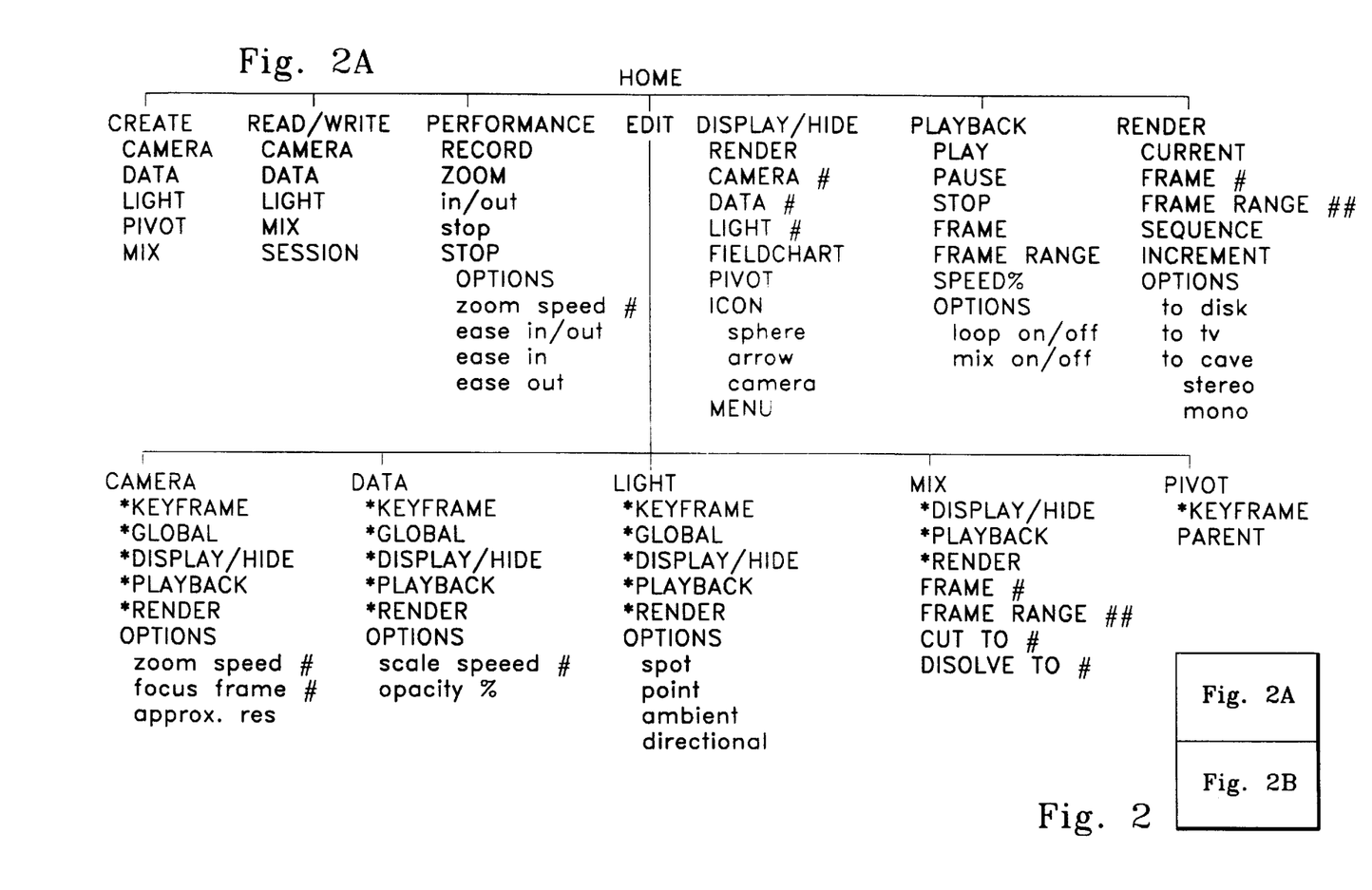
FIGS. 2, 2(a) and 2(b) shows a preferred menu structure.
Figure 2B:
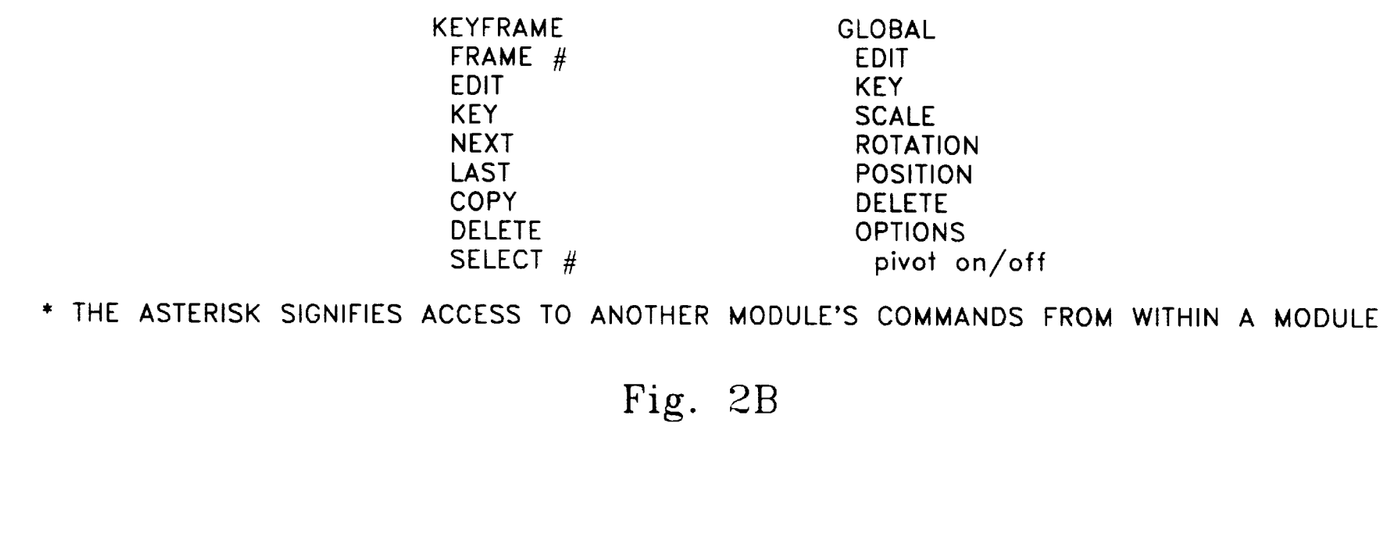

A preferred menu structure is shown in FIGS. 2, 2(a) and 2(b), and includes a list of commands allowing the operator 14 to activate functions for control with the wand 28. Many functions, such as zoom and spatial movements are controlled spatially, after function activation through voice commands. Table 2 shows a list of voice commands and describes their function.

TABLE 2

MAIN menu (global commands with a variety of integer and word options)

| | |
|---|---|
| play [speed\|shuttle]>stop | (plays camera at defined speed or shuttle mode) |
| stop | (stops numerous functions) |
| time [speed\|shuttle]>stop | (prior to an established camera move, time plays/shuttles the simulation or scene) |
| key [+\|-\|i\|f] | (key [enter] establishes a keyframe, k + 1 advances the current frame to the next key) |
| frame [f] | (sets current camera frame to the specified frame number) |
| path [i] | (selects camera path from multiple paths) |
| erase [i] | (erases camera path I) |

NAVI menu (navigate functions, triggered by command and stopped with "rel" ease)

| | |
|---|---|
| fly>rel | (activates freeform fly mode, stop with release command) |
| trans>rel | (translates user in environment, stop with release command) |
| scale>rel | (scales cave space relative to data environment) |
| curr>rel | (centers the cave at the current frame, enables cave to fly along defined camera path) |

EDIT menu (spline editing functions, triggered by command and stopped with "rel" ease)

| | |
|---|---|
| adjust>rel | (uses one tenth of wand motion for fine adjustments of spline keyframes in both position and orientation) |

TABLE 2-continued

| | |
|---|---|
| assign>rel | (assigns current wand position to current keyframe) |
| attach>rel | (attaches the camera to the wand for interactive placement, I say the "camera" voice command to enter attach) |
| mvto [f] | (moves current keyframe to the specied new frame number) |
| rem | (removes current camera keyframe) |
| fov [i] | (set the cameras field of view in degrees) |

DISP menu (toggles display on/off)

| | |
|---|---|
| scene | (display of virtual scene on/off) |
| path | (display of spline paths on/off) |
| cursor | (display of camera icon on/off) |
| tele | (display of virtual television monitor on/off) |
| chart | (display field chart superimposed on virtual monitor on/off) |
| text | (display of text menus and feedback on/off) |
| saxis [f] | (display camera up vector and normals at specific frame intervals along the spline) |
| spoint [f] | (the spline is displayed as a series of points. This command specifies how often to draw them, usually one per frame) |

SRCE menu (selects camera input tracking device)

| | |
|---|---|
| cave | (assign camera input to the cave origin in virtual space) |
| head | (assign camera input to head tracker position and rotation) |
| wand | (assign camera input to the wand spatial tracker) |

FILE menu (reads and writes spline data and configuration information)

| | |
|---|---|
| rdata [filename.vd] | (read virtual director format splines) |
| wdata [filename.vd] | (write virtual director format splines) |
| rconf [filename.cf] | (read virtual director configuration information) |
| wconf [filename.cf] | (write virtual director configuration information) |
| wfout [filename.wf] | (write spline data in a standard ASCII output) |
| srout [filename.sr] | (write spline data in matrix format) |

As will be apparent to skilled artisans, many functions are available through the voice and spatially tracked six degree of freedom interface with the immersion environment.

Navigation

Navigation through virtual worlds is rendered straightforward and is intuitive in nature. An extended use of the navigation would be the documenting of pathways in cyberspace and the Internet's information space. Any multivariate three dimensional data space can be successfully used as the environment 12 in the present system. For example, a desktop workstation stereo display might be used in place of the CAVE™ immersion environment. The desktop display might use a three dimensional joystick or similar device, which permits up and down movements.

Animation work would also benefit from the present system. The voice command and spatially based gesture control for creating, performing, editing and playback of computer graphics camera motion and/or object motion provides exceptional facility to the operator who is involved in choreographing animations.

Similarly, complex scientific data exploration is simplified. The intuitively controlled instant recording and playback functionality through three dimensional data space facilitates any complex data structure exploration. One of the major problems in viewing complex three dimensional scientific data is that the operator gets lost. Using the present system 10 is a way to facilitate the operator's exploration, and provides a pseudo physical location feel that should reduce the risk that an operator will become lost in a data structure. Separately, the present system is an excellent way for preventing repetitive strain injury due to keyboard and mouse usage. Many of the standard tools to navigate data sets are very mouse and keyboard intensive and require many repetitive actions to accomplish the same tasks that virtual director 16 of the present system 10 provides with gesture and voice.

In adapting the virtual director 16 to alternate immersion environments 12, the basic image production facilities are utilized without significant alteration. Thus, the system 10 is created through a module style addition of the virtual director 16 and a suitable voice 18 system and gesture input system 20. This allows previously defined applications to be continued to be used after creation of a system according to the invention by addition of the virtual director 16.

This task will be described by way of example through reference to the preferred system 10 that utilizes a CAVE™ virtual environment. The only common standards among CAVE™ applications are Unix-C programming, the OpenGL drawing library, and the CAVE™ distribution and display library. Some developers are experimenting with Performer CAVE™, WorldToolKit CAVE™, Inventor CAVE™, or Wavefront CAVE™, to take advantage of specific features of these packages, but for reasons of generality, history, and otherwise, creation of a system of the invention 10 by addition of a virtual director 16 seeks to maintain the flexibility of the standard CAVE™ loop.

The CAVE™ library defines a standard main event loop that synchronizes and drives graphical callback routines over an extendable array of stereo graphics pipes. The application developer basically defines a three dimensional routine in C programming language which describes a three dimensional model using SGI Graphics language and which may be static, time-based, or input-based in character, and the CAVE™ runtime library executes that routine for each eye, for each view, for each pipe, and for each graphics machine. The graphics routine does not specify an image within the image plane itself, but rather as a set of three dimensional coordinates in space. The CAVE™ sets the frustrum projection based on the live head tracking and the wall corners, automatically making the data geometry appear projected directly in the real three dimensional space of the CAVE™. The duration of the graphics rendering determines the bottom line frame-rate of the entire loop. Twelve frames per second is a reasonable target for workable interaction. For normal stereo display, this means that the display routine must execute in $\frac{1}{24}$th of a second.

The CAVE™ provides space in the main loop for a parent process function (PPR) that is executed outside of any graphical context for shared data computation and management, and space for a frame-function callback routine (FFN), executed once per frame within each graphical context for local updates and other graphical processing. There may be more than one main loop, depending on the configuration, but the idea here is that the PPR precomputes the application data at the same time that the display routine (DSP) executes using the data that was prepared during the previous frame. The data is exchanged at a synchronization point between frames. The graphics pipe swaps the final rendered image to the front display buffer at the same synchronization point, two frames after the computation of the frame began in the parent process, or $\frac{1}{6}$th of a second in the above example. This is represented by the pseudo code in FIG. 3.

Figure 3:
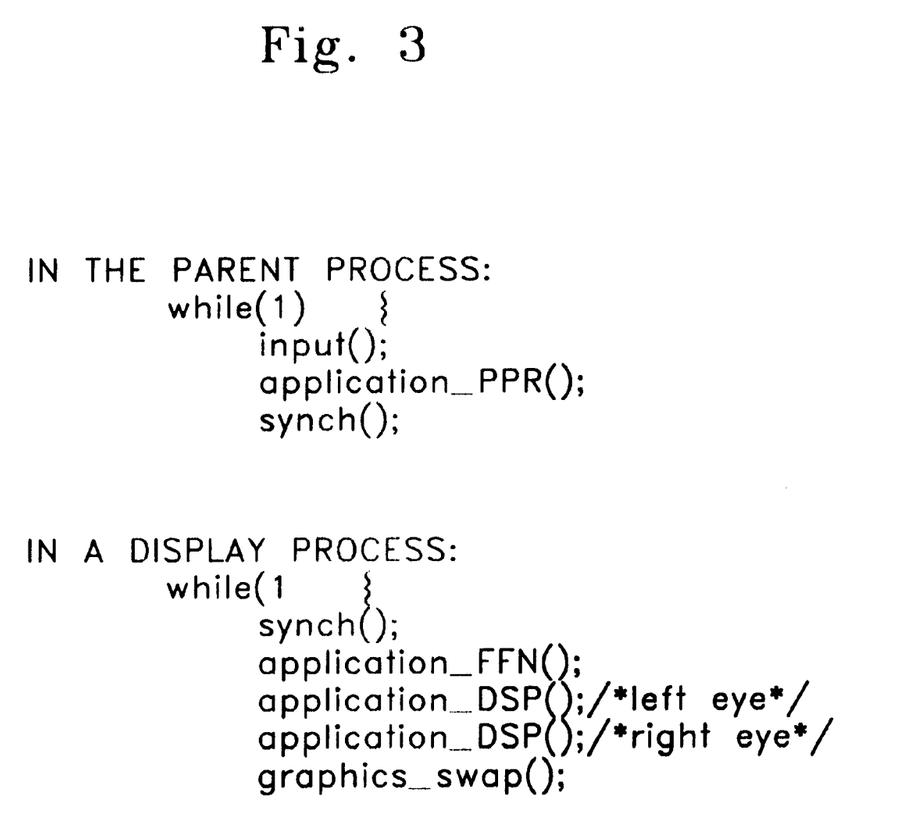
FIG. 3 shows a set of call back routines utilized by the system of the present invention.

As seen in FIG. 3, the general CAVE™ application (APP) may be characterized as a set of three callback routines {PPR, FFN, DSP}, executed over a sequence of synchronized, display-constrained timesteps, with an input CAVE™ set of two six degree of freedom (6DOF) trackers, three buttons, one joystick, and a commandline. The CAVE™ also provides network input data from remote user environments among other conveniences, but these are superfluous to the basic application structure. The virtual director 16 fits between the CAVE™ loop structure and the APP, such that it does not interfere heavily with general APP functionality, and has privileged control of timing and rendering to allow the manipulation of virtual cameras within the display context.

A prototype version of virtual director system 10 has been used to model the basic trappings of a live video recorder within the virtual scene, combined with the digital editing and interpolation capabilities for refinement. The director 16 is given full navigational freedom to move about the data space presented in the CAVE™ immersion environment and interact where possible, key arbitrary camera frames, record live tracker data, and preview the results on a virtual video image. The wand tracker has a secondary role for selecting, adjusting, and reassigning key frames on the camera path, and a tertiary role of navigation and general APP interaction.

A three dimensional scene is developed to display and perhaps animate within the CAVE™ display loop structure, detailed enough at the very least to represent the environment desired for rendering, while simple enough to display at interactive rates. This scene provides the application work space and the source of imagery in the preview camera.

The PC-based voice recognition system 34 sends ASCII token strings to the CAVE™ commandline, enabling the use of a command menu, such as that shown in FIG. 2, of essentially unlimited size. This both circumvents the input bottleneck of the standard CAVE™ interface, and provides an alternative approach to control that does not depend on the repetitive button clicking known to cause work related strain.

Editing of video data conventionally means simple piecewise cutting and pasting video segments from multiple sources onto a master cut. In the virtual dirctor context, editing takes on a new meaning. The spline nodes that define a camera path can have their position, orientation, field-of-view (FOV), and timing reassigned, and the in-between reinterpolated, nodes can be inserted or deleted, or the path can be extended or trimmed. This is, in a sense, pre-editing, as opposed to post-editing.

Since the camera path is built on top of an animation timing structure, the operator has full control of the global clock, and hence all time-based events. A live recording can be conducted in slow motion, such that the playback has a more detailed resolution, or at a faster rate for more deliberate and smoother motion.

A finished path may be rendered preview-style, using the same display routine used in the CAVE™ loop. The animation can be recorded onto video tape from the video signal directly off the graphics engine in real-time. Alternatively, the path can be written into a format to be read by a rendering package in conjunction with a corresponding scene description. When a path is complete, the operator can begin a nonreal-time rendering process with confidence in the integrity of the camera path. The only data that virtual director records is the camera path, keeping storage demands relatively light.

The quality of incoming tracker data is limited spatially by tracker range, system calibration accuracy and the inevitability of noise and periodic interference. Since the program loop rate is constrained by the graphical execution rate, the temporal quality will often be coarse and nonuniform. The virtual director 16 assumes that tracker data has been pre-filtered and calibrated by the CAVE™ system, so that within the tracker range, data is accurate and reliable. Limited tracker range is dealt with by allowing the director to navigate the CAVE™ to any desired working location, and scale the CAVE™ large or small to control the volume of working space.

Temporal integrity is of particular interest to animators because the animation will require quality data at some specific uniform rate, say, 24 or 30 frames per second, depending on the final format. It is also valuable for a path representation to convert easily from one rate to another, while maintaining consistent timing. Perhaps an animation is developed and previewed for 30 fps video, and then a decision is made to render for 24 fps film.

Furthermore, the operator 14 will desire control over the smoothness of the path in some areas, and the ability to insert new data in other areas for more detailed and quick motion. Of equal importance is the ability to build up a path from scratch by keying points of view in arbitrary times in the animation, rather than performing the motion in real-time.

The virtual director 16 maintains a path internally as a sorted linked list of time-stamped keyframes (keys). Assuming no two keys have the same time-stamp, the path can be evaluated for any exact time that falls within the first and last key times. Thus, no matter how the keys were obtained, the path can be evaluated for any desired output frame rate. Keys can be inserted, concatenated, or deleted at the whim of the operator. The system automatically reevaluates the path with the desired animation rate to allow each frame to be previewed. If the system is reconfigured for a different animation rate, a previously created path will maintain the same time-stamping, but the path presented to the operator will be evaluated with a different number of frames over a given interval.

As a result of this method, the graphical performance rate of a CAVE™ session will not cause tracker data aliasing in the animation. In the worst case, the recording rate will be too slow to pick up the finer nuances of live tracker motion, since the tracker is recorded only once per CAVE™ frame, and the path will be too smooth. If more detail is desired, the scene can be simplified for better temporal resolution, or alternatively, the motion can be recorded at a slower clock rate, such that the recording intervals are "virtually" shorter. Editing features aside, the key benefit of this approach to path representation is to decouple the CAVE™ display rate from the animation rate which the operator 14 is using to design the animation.

The data utilized by the virtual director 16 are key values, such as keyframes, and splines which may be used to fill in data between key values. Any function that can evaluate a continuous path between discrete values can be a spline function.

Any good spline usually tries to meet some criterion suited to a particular task. Much fuss is made over the quantifiable "smoothness" of a given spline function, and several recent approaches have been dedicated to splining that guarantees smoothness to arbitrary degrees.

The virtual director 16 uses a time-based spline, a spline that represents the interpolation of values over the domain of time. Given a list of timed keys, the spline takes the clock time "t" as the spline parameter and returns a data packet representing a set of interpolated values appropriate for the exact time "t". It is important that this spline be interpolating, as opposed to just approximating, such that the return value for a specific key time is identical to the original key values. The system 10 attempts to maintain the most reasonably accurate representation of the original tracker data as possible. If a key was at position "x" at time "t", it is reasonable to expect that the path will return the value "x" given the same time "t". Since the tracker data is assumed accurate, the goal is to reconstruct the continuous path that the real 28 tracker traversed as precisely as possible, based on discrete samples, such as keyframes. Local tangential or velocity vectors are not part of this criterion, since they are not a component of the tracker samples. Such control can be added as a supplementary feature, but presents interface design difficulties.

Discussion of time-based splines makes it easier to understand the impact of quantifiable smoothness in the spline, or its degree of continuity. A path with no continuity will result in discontinuous jumps from one point to the next, with practically infinite velocity between points, and an abrupt stop at each point. A path that is linearly continuous C^0 will result in straight lines between points, with constant velocity from one point to the next, but with practically infinite acceleration at the points, and zero acceleration between points. In both of these cases, the path is not visually smooth when viewed either in its entirety, or over time. The infinite acceleration of the C^0 path amounts to a "slap" which is quite visually distracting. A path with continuity of the first derivative C^0 is much improved because the translation is continuous, the velocity is continuous, and the acceleration is at worst instantaneous, amounting to a "shove" rather than a slap. Since the beginning of a shove is much harder to discern as a discrete event, C^1 is sufficient for the moment to achieve visual smoothness, and even gives sufficient control to create a "slap" when desired.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A virtual reality system for displaying a three dimensional data structure and for permitting an operator to interact with the three dimensional data structure, the virtual reality system comprising:

a three dimensional image environment capable of displaying the three dimensional data structure to the operator in a virtual three dimensional form;

a voice recognition system for permitting the operator to select view and operate functions for use with the three dimensional data structure;

a three dimensional input device having six degree of freedom movements for tracking three dimensional movements caused by the operator to control view and operate functions selected through the voice recognition system;

a virtual director for accepting three coordinate location and three coordinate rotation input from said three dimensional input device, converting the input to spline nodes, storing the spline nodes and for commanding said three dimensional image environment to alter the display of the three dimensional data structure depending upon the input and selected view and operate functions.

2. The virtual reality system according to claim 1, wherein the spline nodes comprise keyframe values.

3. The virtual reality system according to claim 2, wherein a keyframe value specifies field of view, three coordinate position, and three coordinate rotation information.

4. The virtual reality system according to claim 3, wherein a keyframe value further comprises a time of keyframe recording.

5. The virtual reality system according to claim 1, wherein said virtual director records a spline path of spline nodes directly from position and orientation of said three dimensional input device when the operator has selected performance recording from the view and operate functions via said voice recognition system.

6. The virtual reality system according to claim 1, wherein said virtual director records a spline path of spline nodes from a virtual navigation flight through the three dimensional data structure when the operator has selected performance recording from the view and operate functions via said voice recognition system.

7. The virtual reality system according to claim 1, wherein said virtual director records a spline path of spline nodes when the operator has selected performance recording from the view and operate functions via said voice recognition system.

8. The virtual reality system according to claim 7, wherein said virtual director edits a recorded spline path in response to operator voice and gesture input to said voice recognition system and said three dimensional input device during an interactive editing traversal through the three dimensional data structure when the operator has selected path editing from the view and operate functions via said voice recognition system.

9. The virtual reality system according to claim 9, wherein said virtual director causes said three dimensional image environment to display a recorded spline path in response to an operator voice command input to said voice recognition system.

10. The virtual reality system according to claim 9, wherein said virtual director causes the display of the recorded spline path to be altered by operator gesture input through said three dimensional input device in accordance with a plurality of selectable display functions enabled by voice input through said voice recognition system.

11. The virtual reality system according to claim 7, wherein the spline path is recorded by said virtual director as a sorted linked list of time-stamped key values.

12. The virtual reality system according to claim 11, wherein said virtual director uses a time-based spline representing an interpolation between the time-stamped key values over time to command display operations in said three dimensional image environment.

13. The virtual reality system according to claim 1, wherein said virtual director commands said three dimensional image environment to display a voice command menu within the three dimensional data structure.

14. The virtual reality system according to claim 13, wherein the voice command menu includes edit, display, playback, create, and performance recording submenus.

15. The virtual reality system according to claim 1, wherein said three dimensional image environment comprises an immersion environment.

16. The virtual reality system according to claim 15, wherein said immersion environment comprises a CAVE™.

17. The virtual reality system according to claim 15, wherein the view and operate functions include virtual camera movement through the three dimensional data structure via operator movement of said three dimensional image input device.

18. The virtual reality system according to claim 17, wherein the view and operate functions include virtual camera movement through the three dimensional data structure via operator movement of said three dimensional image input device.

19. The virtual reality system according to claim 1, wherein the view and operate functions include editing previously recorded spline nodes by relative and scaled movements of said three dimensional input device.

20. The virtual reality system according to claim 1, wherein the view and operate functions include virtual transport control to enable transport to a previously recorded spline.

21. The virtual reality system according to claim 20, wherein the previously recorded frame is a previously recorded spline node.

22. The virtual reality system according to claim 1, wherein the view and operate functions include a repositioning of a virtual position of the operator in the three dimensional data form according to a selected previously recorded spline.

23. The virtual reality system according to claim 1, wherein the view and operate functions include flight through the three dimensional data structure.

* * * * *